United States Patent [19]

Heath et al.

[11] Patent Number: 5,038,320
[45] Date of Patent: Aug. 6, 1991

[54] COMPUTER SYSTEM WITH AUTOMATIC INITIALIZATION OF PLUGGABLE OPTION CARDS

[75] Inventors: Chester A. Heath; John K. Langgood, both of Boca Raton, Fla.; Ronald E. Valli, Pittsburgh, Pa.

[73] Assignee: International Business Machines Corp., Armonk, N.Y.

[21] Appl. No.: 296,387

[22] Filed: Jan. 6, 1989

Related U.S. Application Data

[63] Continuation of Ser. No. 21,391, Mar. 13, 1987, abandoned.

[51] Int. Cl.$^5$ .................. G06F 13/00; G06F 7/04
[52] U.S. Cl. ...................... 364/900; 364/948.5; 364/944.61; 364/975.2; 364/976.4; 364/945; 364/929.5; 364/929.2; 371/11.1
[58] Field of Search ... 364/200 MS File, 900 MS File; 340/825.07, 825.06, 825.52, 825.06; 371/11.1, 11.2, 11.3, 66, 7

[56] References Cited

U.S. PATENT DOCUMENTS

| | | | |
|---|---|---|---|
| 3,480,914 | 11/1969 | Schlaeppi | 364/200 |
| 3,510,843 | 5/1970 | Bennett | 364/200 |
| 3,573,741 | 4/1971 | Gavril | 364/200 |
| 3,818,447 | 6/1974 | Craft | 340/172.5 |
| 4,003,033 | 1/1977 | O'Keefe | 364/200 |
| 4,015,244 | 3/1977 | Simpson | 364/200 |

(List continued on next page.)

FOREIGN PATENT DOCUMENTS

| | | |
|---|---|---|
| 0041406 | 9/1981 | European Pat. Off. . |
| 0087368 | 8/1983 | European Pat. Off. . |
| 0121331 | 3/1984 | European Pat. Off. . |
| 0121381 | 10/1984 | European Pat. Off. . |
| 0136178 | 4/1985 | European Pat. Off. . |
| 0179981 | 6/1985 | European Pat. Off. . |
| 0171073 | 2/1986 | European Pat. Off. . |
| 0182044 | 5/1986 | European Pat. Off. . |
| 0200198 | 11/1986 | European Pat. Off. . |
| 3508648 | 9/1986 | Fed. Rep. of Germany . |
| 50-120935 | 9/1976 | Japan . |

(List continued on next page.)

OTHER PUBLICATIONS

IBM TDB vol. 20, No. 7, Dec. 1977, Input/Output Device Address Recognition Mechanism.

(List continued on next page.)

*Primary Examiner*—Gareth D. Shaw
*Assistant Examiner*—Paul Kulik
*Attorney, Agent, or Firm*—Winfield J. Brown, Jr.; Robert Lieber

[57] ABSTRACT

A data processing system includes a planar board having a central processing unit (CPU), a main memory unit, and input/output (I/O) sockets or slots, each adapted to receive a selected one of a plurality of different and/or similar option cards. each card contains (or is connected to) and controls a respective peripheral device; and each card is pre-wired with an ID value corresponding to its card type. Software programmable option registers on each card store parameters such as designated default (or alternate) address information, priority levels, and other system resource parameters. A setup routine, during initial power-on, retrieves and stores the appropriate parameters in the I/O cards and also in slot positions in main memory, one position being assigned to each slot on the board. Each slot position is adapted to hold the parameters associated with the card inserted in its respective slot and the card ID value. That portion of main memory containing the slot positions is adapted to maintain the parameter and ID information by means of battery power when system power fails or is disconnected, i.e., a nonvolatile memory portion. Subsequent power-on routines are simplified by merely transferring parameters from the table to the card option registers if the status of all the slots has not changed since the last power-down, system reset, or channel reset.

18 Claims, 7 Drawing Sheets

U.S. PATENT DOCUMENTS

| | | | |
|---|---|---|---|
| 4,025,903 | 5/1977 | Kaufman | 364/200 |
| 4,027,108 | 5/1977 | Moorehead | |
| 4,070,704 | 1/1978 | Calle et al. | 364/200 |
| 4,075,693 | 2/1978 | Fox | 364/200 |
| 4,155,117 | 5/1979 | Mitchell, Jr. | 364/200 |
| 4,177,511 | 12/1979 | Taddei | 364/200 |
| 4,191,996 | 3/1980 | Chesley | 364/200 |
| 4,236,207 | 11/1980 | Rado | 364/200 |
| 4,253,087 | 2/1981 | Saal | 340/147 R |
| 4,253,144 | 2/1981 | Bellamy | 364/200 |
| 4,254,463 | 3/1981 | Busby | 364/200 |
| 4,268,901 | 5/1981 | Subrizi | 364/200 |
| 4,293,924 | 10/1981 | Struger | 364/900 |
| 4,303,993 | 12/1981 | Panepinto | 365/230 |
| 4,314,354 | 2/1982 | Felder | 364/900 |
| 4,335,426 | 6/1982 | Maxwell | 364/200 |
| 4,356,475 | 10/1982 | Neumann | 340/521 |
| 4,360,870 | 11/1982 | McVey | 364/200 |
| 4,363,094 | 12/1982 | Kaul | 364/200 |
| 4,373,181 | 2/1983 | Chisholm et al. | 364/200 |
| 4,400,775 | 8/1983 | Nozaki | 364/200 |
| 4,432,049 | 2/1984 | Shaw et al. | 364/200 |
| 4,437,157 | 3/1984 | Witalka | 364/200 |
| 4,442,504 | 4/1984 | Dummermuth | 364/900 |
| 4,454,596 | 6/1984 | Wunsch | 364/900 |
| 4,458,357 | 7/1984 | Weymouth | 377/2 |
| 4,491,913 | 1/1985 | Calvignac | 364/200 |
| 4,514,728 | 4/1985 | Ahuja | 340/825.5 |
| 4,521,847 | 6/1985 | Ziehm et al. | 371/7 X |
| 4,556,953 | 12/1985 | Caprio et al. | 364/900 |
| 4,562,535 | 12/1985 | Vincent et al. | 364/200 |
| 4,563,736 | 1/1986 | Boudreau | 364/200 |
| 4,571,676 | 2/1986 | Mantellina | 364/200 |
| 4,578,773 | 3/1986 | Desai | 364/900 |
| 4,589,063 | 5/1986 | Shah et al. | 364/200 |
| 4,604,690 | 8/1986 | Crabtree et al. | 364/200 |
| 4,622,633 | 11/1986 | Ceccon et al. | 364/200 |
| 4,626,634 | 12/1986 | Brahm | 379/28 |
| 4,633,392 | 12/1986 | Vincent | 364/200 |
| 4,654,857 | 3/1987 | Samson | 371/68 |
| 4,660,141 | 4/1987 | Ceccon | 364/200 |
| 4,670,855 | 6/1987 | Caprio | 364/900 |
| 4,701,878 | 10/1987 | Günkel et al. | 364/900 |
| 4,713,834 | 12/1987 | Brahm | 379/28 |
| 4,718,038 | 1/1988 | Yoshida | 364/900 |
| 4,750,136 | 6/1988 | Arpin et al. | 364/200 X |
| 4,760,553 | 7/1988 | Buckley et al. | 364/900 |
| 4,787,025 | 11/1988 | Cheselka | 364/200 |
| 4,787,028 | 11/1988 | Finfrock et al. | 364/900 X |
| 4,787,030 | 11/1988 | Harter | 364/200 |
| 4,870,704 | 9/1989 | Matelan | 364/200 |

FOREIGN PATENT DOCUMENTS

| | | |
|---|---|---|
| 54-24314 | 3/1979 | Japan . |
| 54-73531 | 6/1979 | Japan . |
| 55-56235 | 4/1980 | Japan . |
| 56-46384 | 10/1982 | Japan . |
| 2101370 | 1/1983 | United Kingdom . |
| 2137382 | 10/1984 | United Kingdom . |
| 2166893 | 5/1986 | United Kingdom . |
| 2175716 | 12/1986 | United Kingdom . |

OTHER PUBLICATIONS

IBM TDB vol. 20, No. 8, Jan. 1978, Initial Microprogram Load by Blocks Via Cycle Steal.

IBM TDB vol. 22, No. 2, Jul., 1979, Even/Odd Addresses to Allow Device Adapter Sharing by More Than One Processor.

IBM TDB vol. 22, No. 5, Oct. 1979, Satellite Station Address Assignment Method.

IBM TDB vol. 22, No. 10, Mar., 1980, Automatic Module Detection.

IBM TDB vol. 23, No. 8, Jan., 1981, Dynamic Device Address Assignment Mechanism.

Electronic Design, Sep. 3, 1981, pp. 141-156, Several Articles, "Functional Architecture Threatens Centra CPUs", etc.

Paper in Euromicro, Input/Output Control 6f IBM System/370 Model 125 through Dedicated Input/Output Processors, by Assmuth et al., pp. 24-40.

Technical Disclosure Bulletin (IBM) vol. 27, No. 1E "Automatic Domain Configuration Mechanism for Multi-Device I/O Controller".

Wescon Technical Paper Oct. 30-Nov. 2, 1984, "A Standard Protocol for Host Computer-Peripheral In terface Allows Upgrading to the Latest Mass Storage Devices".

Technical Disclosure Bulletin (IBM) vol. 27, No. 2, Jul 1984 "Input/Output Channel Address Assignmen Mechanism".

JP Abstract vol. 10, No. 256 (P-493) (23312) Sep. 2 1986.

JP Abstract vol. 9, No. 239 (P-391) (1962) Sep. 25 1985.

JP Abstract vol. 9, vol. 9, No. 190 (P-378) (1913) Aug 7, 1985.

EDN Magazine vol. 26 (1981) Feb., No. 3, Boston, MA New Electronics 19(1986) Jul., No. 14, London, Grea Britain.

vol. 22, No. 3, Aug. 1979, IBM Technical Disclosur Bulletin, Programmable Identification for I/O Device J. M. McVey.

vol. 16, No. 1 Jun. 1973, IBM Technical Disclosur Bulletin, Program Controlled I/O Address Assignmen L. J. Rosenberg.

COMPUTER SYSTEM WITH AUTOMATIC INITIALIZATION OF PLUGGABLE OPTION CARDS

This is a continuation of co-pending application Ser. No. 07/021,391 filed on 03/13/87, now abandoned.

BACKGROUND OF THE INVENTION

Users of smaller computer systems typically do not have sophisticated programming skills, and user-transparent programmable parameter switches have been suggested to simplify configuration of the systems to the user's needs. However, the routines that are required to so configure such systems are complex, error prone, and time consuming. It is an objective of the present improvement to substantially reduce the time delay experienced by a user before he can do productive work on the system upon re-powering or resetting of the system after a power-down, so long as no cards are changed in, added to, or removed from the slots.

SUMMARY OF THE INVENTION

In the improved system, each card type is provided a unique ID, which value is hardwired on each card. A register is also provided on the card to store parameter data such as an address factor (to programmably change the I/O address space of the card where required), priority, status, and other system information providing for the efficient transfer of data between the system processor and the card, and between cards.

When two or more of the same card type are used in the system, parameter data may be used to permit use of the cards at different priority levels or to render redundant cards inactive.

One portion of main memory is provided with battery backup to power that portion when system power fails or is turned off. Positions in this nonvolatile portion of memory are provided (one for each I/O slot) to store the ID values of the cards inserted in the respective slots together with the respective card parameter data.

When the system is first configured and initialized, a complex routine is executed to create and/or fetch all of the parameter data required for the cards attached to the system, to resolve system resource conflicts and to store the data into the appropriate card registers and the memory slot positions.

However, if after a power-down, no change is made in the cards attached to the slots or in the slot positions of the cards, a simplified setup routine determines that no change has been made by comparing each card ID with the ID value stored in the respective slot position. Then the routine transfers the parameter data from the memory slot positions to the respective card registers; and the system is ready for normal operation.

After the system is configured and initialized, a feedback line is provided to signal the use of the select mechanism during normal operation. Routines are invoked to check the response of each card to given select resources to detect duplicate use of a select resource.

These and other features of the present improvement will be apparent from the following detailed description and accompanying drawings, in which:

DETAILED DESCRIPTION

Figure 1:
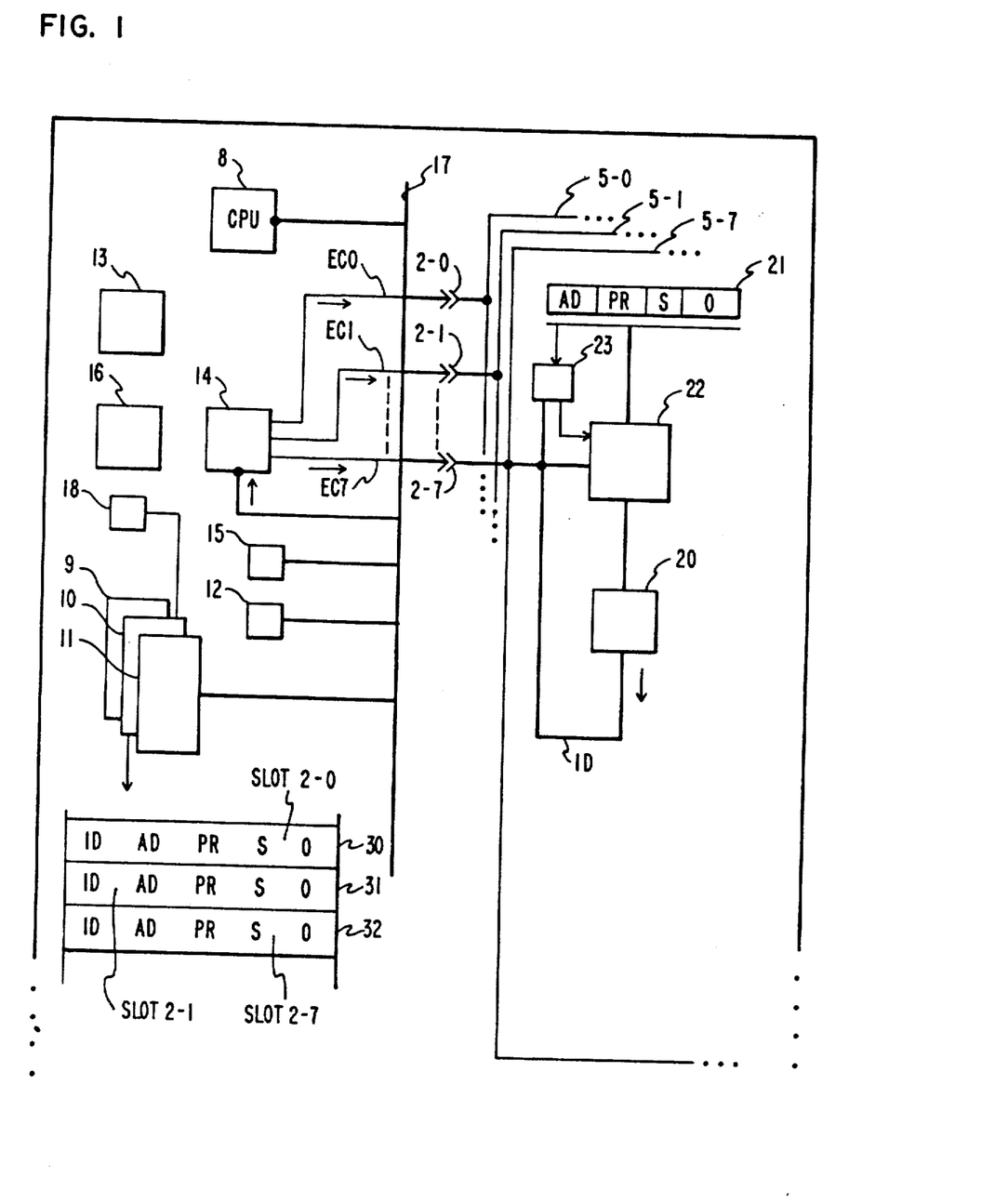
FIG. 1 is a fragmentary block diagram of the improved system.

FIG. 1 illustrates a preferred embodiment of the present improvement in the form of an integrated circuit desktop type computer system featuring user-transparent establishment of addressing and other variable system resource parameters for attached peripheral options. Thus the user is not burdened with having to set dip switches, follow complex setup procedures, etc. System resource conflicts are reduced or eliminated by reassigning of parameters. Other parameters include priority levels and a state bit which allows for coexistence of two identical option attachments.

Figure 2:
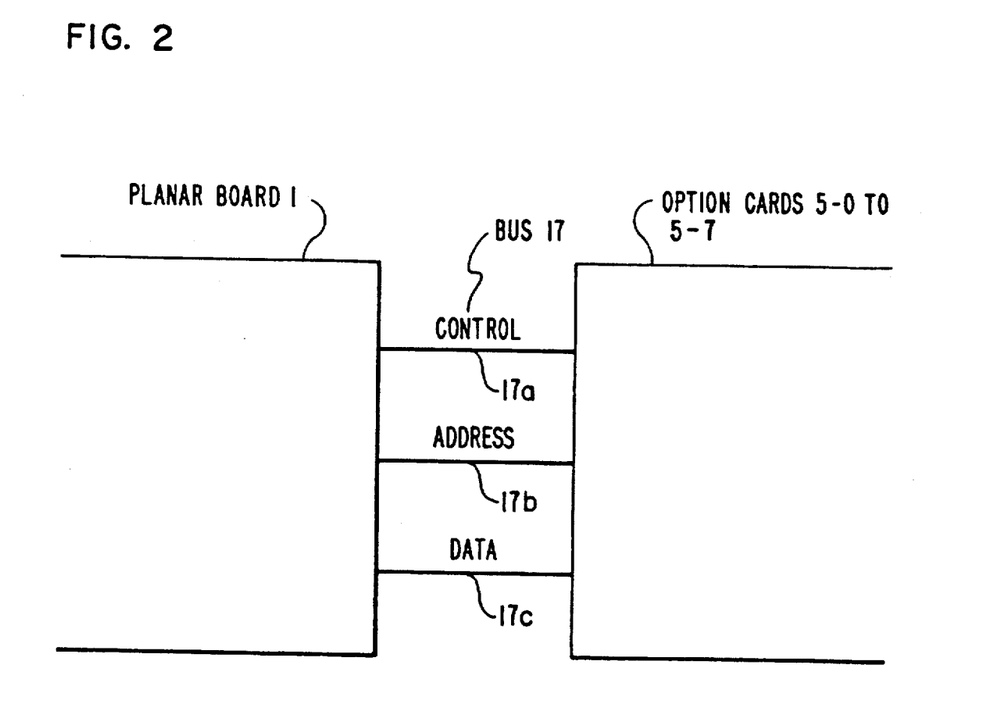
FIG. 2 illustrates the bus structure.

System board 1 contains plural sockets or slots 2-0 to 2-7 into which I/O option cards 5-0 to 5-7 may be interchangeably plugged. These cards control various types of peripheral devices (disk drives, printers, etc.) and add-on memory which are either integrally contained on respective cards or attached thereto via external connectors, not shown. Board 1 also contains elements of the central processing system, including a central processor unit (CPU) 8, random access memory (RAM) main memory modules 9, 10, 11, direct memory access (DMA) controls 12, timing controls 13, slot address decoder 14, whose function is described below, other logical elements not relevant to the present discussion indicated collectively at 15, power supply 16, and bus 17 which links the central processing elements with each other and with attached peripherals. Darkened portions of the bus represent plural address lines 17b, data lines 17c, and control lines 17a (FIG. 2).

A feature hereof is that slots 2-0 to 2-7 can be addressed by "slot address" signals on the address lines of bus 17 during setup routines, and cards residing in the slots can be separately addressed by "I/O address" signals on the address lines during normal program execution; where the slot addresses and I/O addresses are distinctly different values associated respectively with physical locations of the sockets and with the types of devices currently attached. Many different types of devices are each potentially attachable to any one of the few sockets of the system.

One of the memory modules, module 10 in the illustration, is nonvolatile, and stores information relative to each of the slots 2-0 to 2-7 and its associated card when the system is powered down. This module for example, may consist of an array of capacitive storage circuits, i.e., known complimentary metal-oxide silicon (CMOS) type semiconductor circuits, configured to operate under system power while the system is powered up and under battery power 18 in the absence of system power. Within this module, a separately addressable space is allocated to each slot, for storing certain information relative to the slot. As shown, this information includes an identity value ID, an addressing factor AD, a priority value PR, a state bit S, and other information O.

Figure 6:
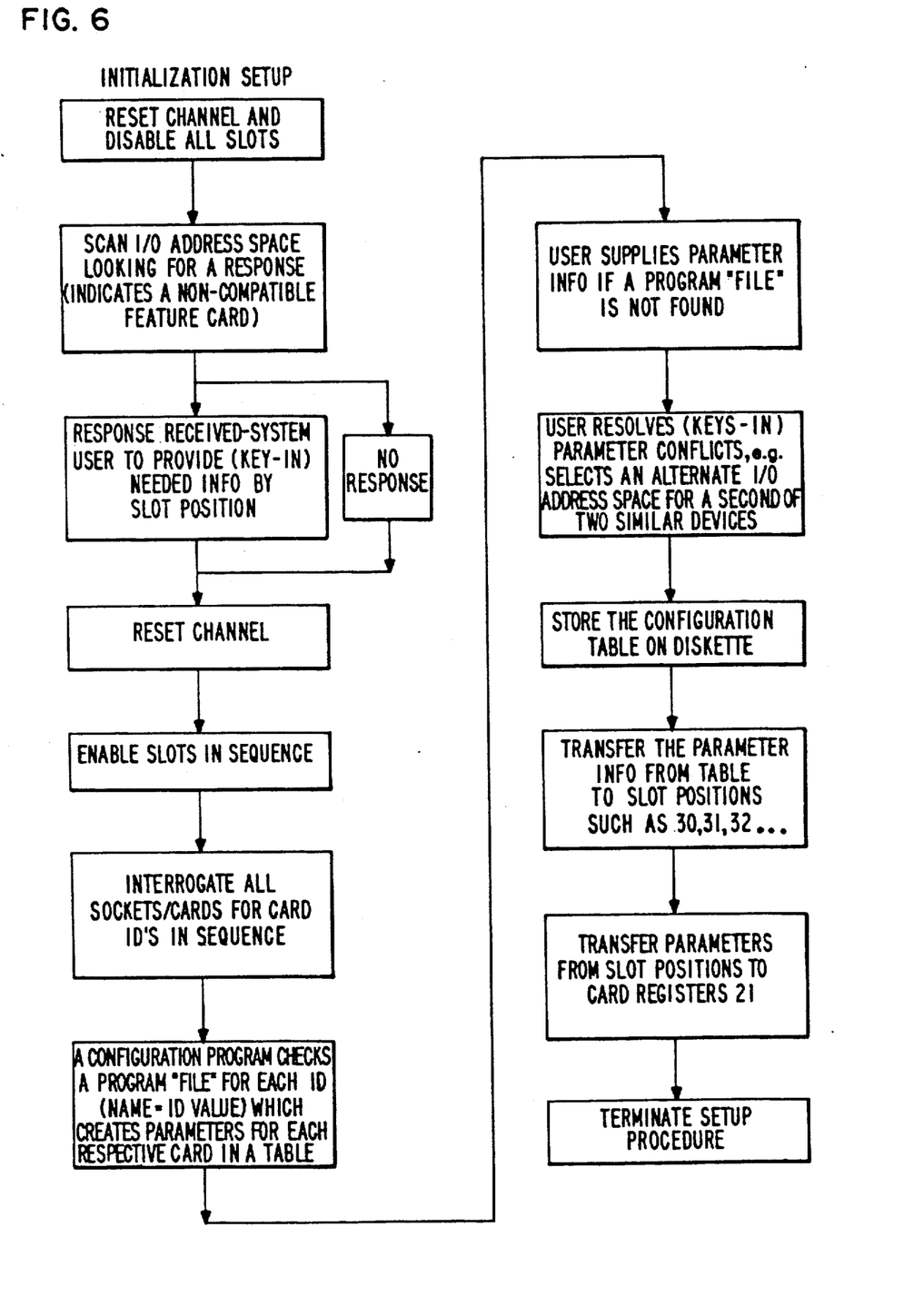
FIGS. 6 and 7 are flowcharts which illustrate briefly the setup routines used in the present system.

A feature to be described is the use of this information in the nonvolatile memory to speed up initialization (FIG. 7) of the system when the slot configuration has not changed since the last power-down, and thereby reduce the time the user has to wait to begin useful applications after operating the system power-on switch, not shown, or after system or channel reset. This difference in complexity and number of steps required is illustrated by FIGS. 6 (initialization) and 7 (POST).

Details of card 5-7 are indicated as representative of the relevant logical organizations of all cards to the extent required for describing the present improvement. Driver circuits 20 are pre-wired at manufacture, and under conditions described below transmit a set of identity signals ID which uniquely identify that card type and its respective peripheral device.

Register 21 stores parameter information for controlling communications between the card and the system, including the address factor AD, the priority value PR, the state bit S, and other information O described with respect to module 10. This information is set by the central system during power-up initialization (FIG. 6). A feature of the system is that, if slot conditions have not changed since the last power-down of the system, the information is simply transferred to register 21 from the nonvolatile memory 10 in a relatively fast operation (FIG. 7), whereas if slot conditions have changed the system is required to perform a lengthy program process (FIG. 6) to retrieve and/or develop some or all of the information and then transfer it to both memory 10 and the card register 21.

Control logic 22 and decode logic 23 control response of the card 5-7 to I/O addresses appearing on bus 17. When power is applied to the system, the cards are addressable initially only through their sockets, and a portion of the address bus. But after the power-up process, the value AD in register 21 controls decoder 23 to detect a default or alternate I/O address associated uniquely to the card type and unrelated to the socket location. Upon such detection, the priority value PR and state bit S in conjunction with control logic 22 determine when data may be exchanged between the card and the bus 17. One manner in which an AD value, the decoder 23 and logic 22 detect an I/O address is shown and described in Interfacing to the IBM Personal Computer by L. Eggebrecht published 1983 at pages 130, 131.

In operation, during its power-up sequence the central system individually addresses the option sockets, by sending respective "slot address" signals on the bus which are uniquely detected by decoder 14 and result in separate activation of setup (or enable card) lines EC0-EC7 extending to respective sockets 2-0 to 2-7 and through the sockets to attached cards 5-0 to 5-7. Upon activation of one such line, if the respective socket is vacant the hexadecimal value of FFFF is returned to the system which terminates further operation relative to that socket. However, if the socket contains a card, the activated line in conjunction with additional address signals on the bus 17 condition logic 22 on the respective card to cause drivers 20 to transmit the ID signals mentioned above which identify the respective card and device type. The system CPU compares the returned ID signals with the ID value stored in the location in memory 10 allocated to the respective slot, and sets an indication denoting whether the compared values are the same or different. This indication serves effectively as a branch condition for subsequent program processes which determine the action to be taken relative to the respective slot.

If the indication just mentioned represents a matching comparison, and conditions of all other slots have not changed, a subsequent program process will simply transfer the value of AD, PR, S, and O, which are currently stored in the associated location of memory 10 to the respective card for storage in its register 21. If the indication represents a non-matching comparison, and if the transmitted ID indicates that the respective slot contains a card, the processor 8 uses the transmitted ID and information gleaned from the other slots to retrieve and/or develop new AD, PR, S, and O values for the respective card using files describing card resource requirements and alternatives. After all card values are established, the values for each card are transferred in sequence first to the respective slot location in memory 10 and subsequently to the respective card register 21.

Mismatching comparisons occur when the state of the interrogated socket has been altered. The ID value stored in memory 10 relative to a socket which was vacant at last power-down is FFFF, and the ID value stored relative to a previously occupied socket is that of the card last occupying that slot. Thus, if a card is installed into a previously vacant slot or substituted for a card having a different ID, a mismatching comparison will occur causing the system to retrieve and/or develop new AD, PR, S, and O values for the responding card.

As noted above, the system cannot deal with mismatching indications until the states of all sockets have been ascertained. This is because the priority level, and in certain instances the address and state values, assigned to any card are relative to the cards in other slots. The address and state values are relative when two cards with the same identity ID are currently installed, either to provide redundant backup for device failure or to provide additional device capacity. In the latter instances, the state value can be used to place a backup device in an inactive state during normal system operation or the priority values can be used to allow both devices to operate fully but at different priority levels.

In the preferred embodiment, system information is stored in the eight slot positions (only three—30, 31, 32—are shown) of module 10 to accommodate up to eight feature cards 5-0 to 5-7. Each slot position is four bytes wide, twenty-eight bytes for seven feature cards. The card ID resides in the first two bytes and the switch (parameter) settings in the last two bytes. The corresponding ID and parameter data on each card resides in drivers 20 and register 21, respectively.

Figure 3:
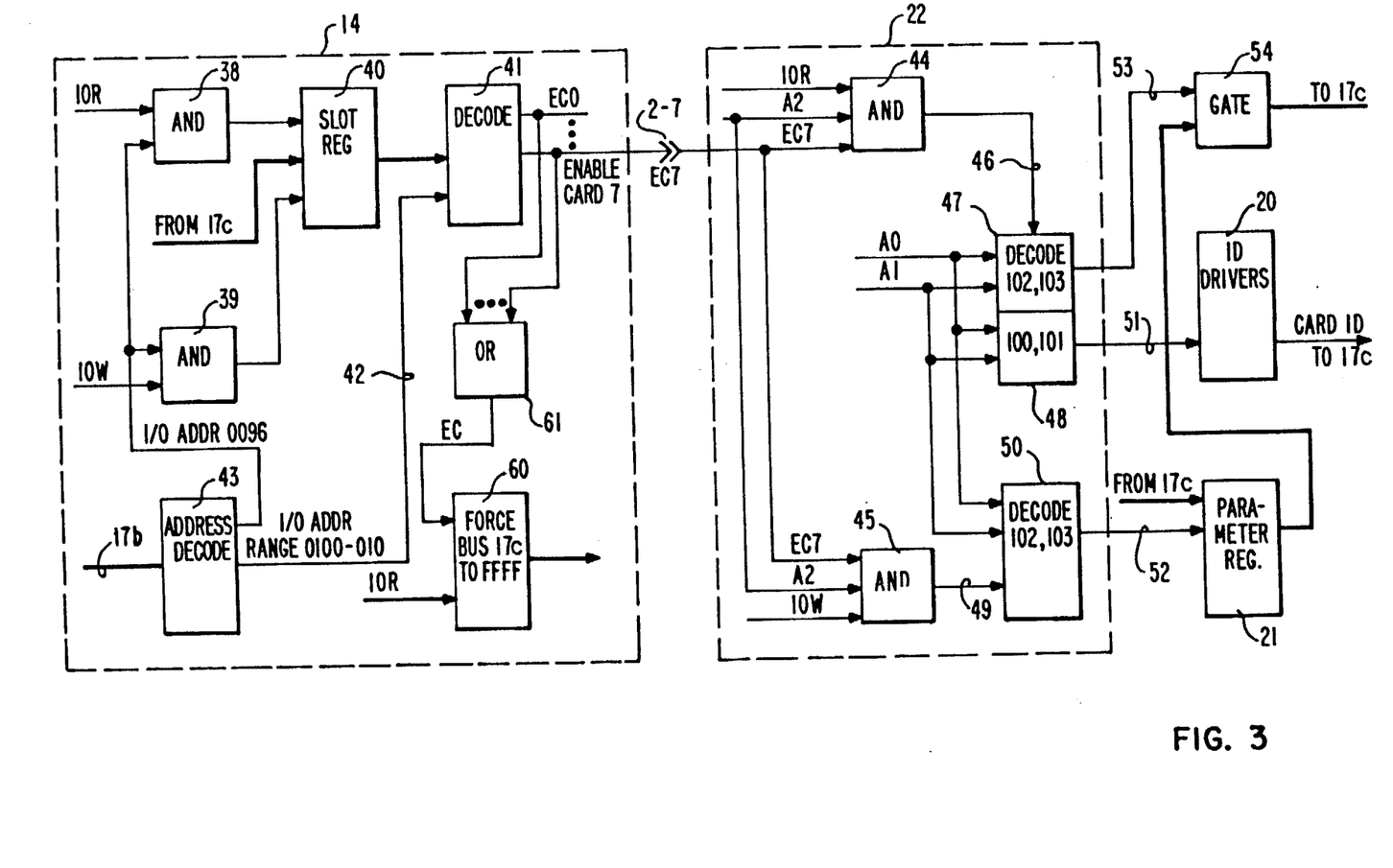
FIG. 3 show certain of the logic utilized by the setup routines.

FIG. 3 shows schematically certain of the logic on the board 1 and feature card 5-7 used during setup routines to read out a card ID and store parameters in the register 21. With respect to FIG. 3, the hexadecimal I/O address values assigned to certain of the components on each of the feature cards is as follows:

096 - socket select value (one byte)
100, 101 - ID drivers 20 (two bytes)
102, 103 - parameter register 21 (two bytes)

These are "dummy" addresses since they are used by the processor 8 to access I/O cards and components via the slots during setup operations. The address 096 selects the logic (gates 38, 39) of slot address decoder 14 for storing the card select value into slot register 40 and also for reading out the value, i.e., during diagnosis. Address lines A0 and A1 of FIG. 3 form the lower address values 00, 01, 02, and 03 for selecting the components 20 and 21, while a logical 1 signal on address line A2 provides the most significant digit value of 1.

A0, A1, and A2 are coupled to appropriate bit lines of address bus 17b, FIG. 2.

Figure 7:
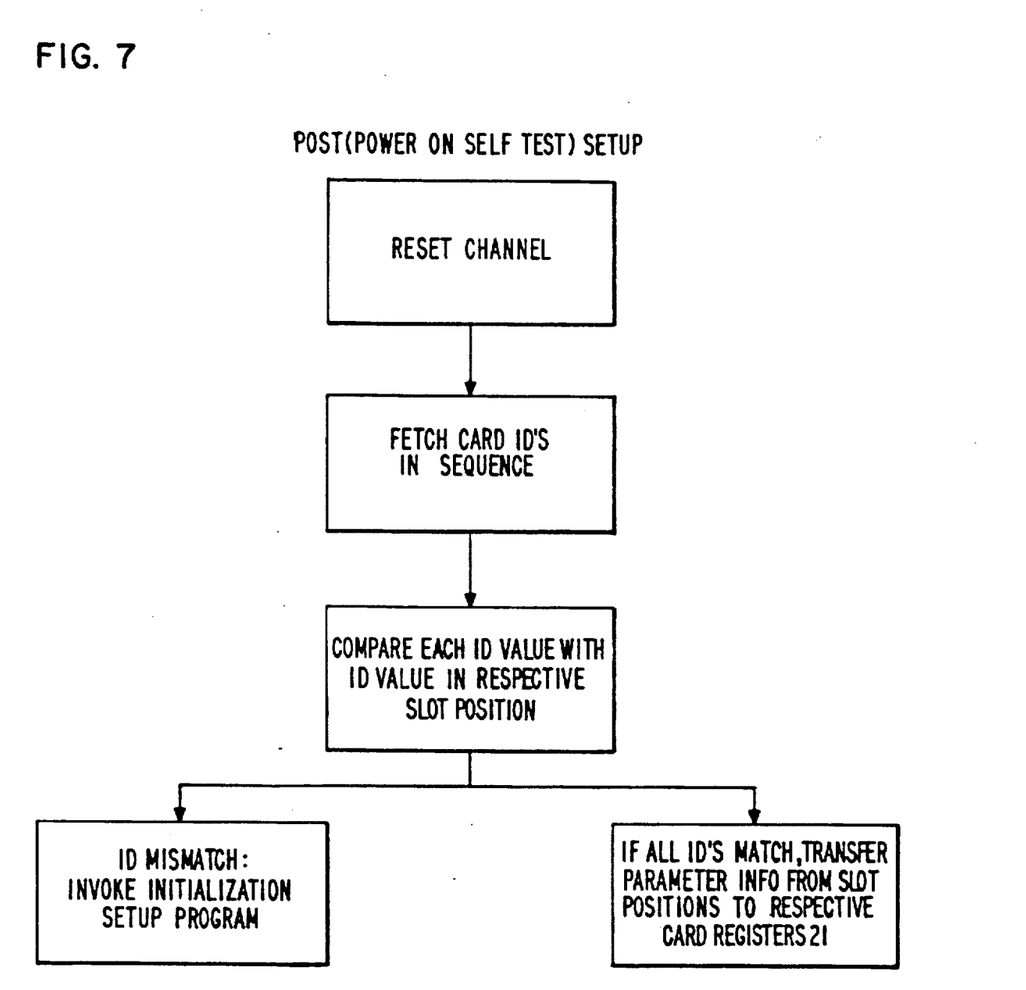

FIG. 3 shows in more detail certain of the logic of the slot address decoder 14 and of the control logic 22 of card 7 which are used in the setup routines of FIGS. 6 and 7. It will be assumed for simplicity of discussion, that addressing of two bytes at a time, i.e., one cycle, is available and that two byte data transfers occurs on busses. Hence, decoding address 101 gates both bytes for addresses 101 and 100.

Slot register 40 is program controlled to store a three bit value (000-111) corresponding to a slot (2-0 to 2-7) to be accessed. A decode circuit 41 changes this three bit binary value to a one in eight line output but only when it is gated by a signal on input line 42. Each output line, such as EC7, is connected via the respective socket to the card held in the socket. When a decode circuit 43 decodes an address in the range 0100 - 0103 during a setup routine, it produces an output on line 42 to gate the value in 40 to cause an output (see FIG. 4) on a card setup line such EC7, one of the control lines 17a of bus 17.

This output on EC7 is applied to AND gates 44 and 45. The address line A2 is coupled to gates 44 and 45. An I/O read line IOR and an I/O write line IOW (decoded from control lines 17a) are coupled respectively to gates 44 and 45. An output 46 from gate 44 is coupled to a pair of decoder circuits 47 and 48. An output 49 from gate 45 is coupled to a decode circuit 50. An output 51 from decode 48 is coupled to the ID driver circuit 20 and the output 52 from decode 50 is coupled to the parameter register 21.

Figure 4:
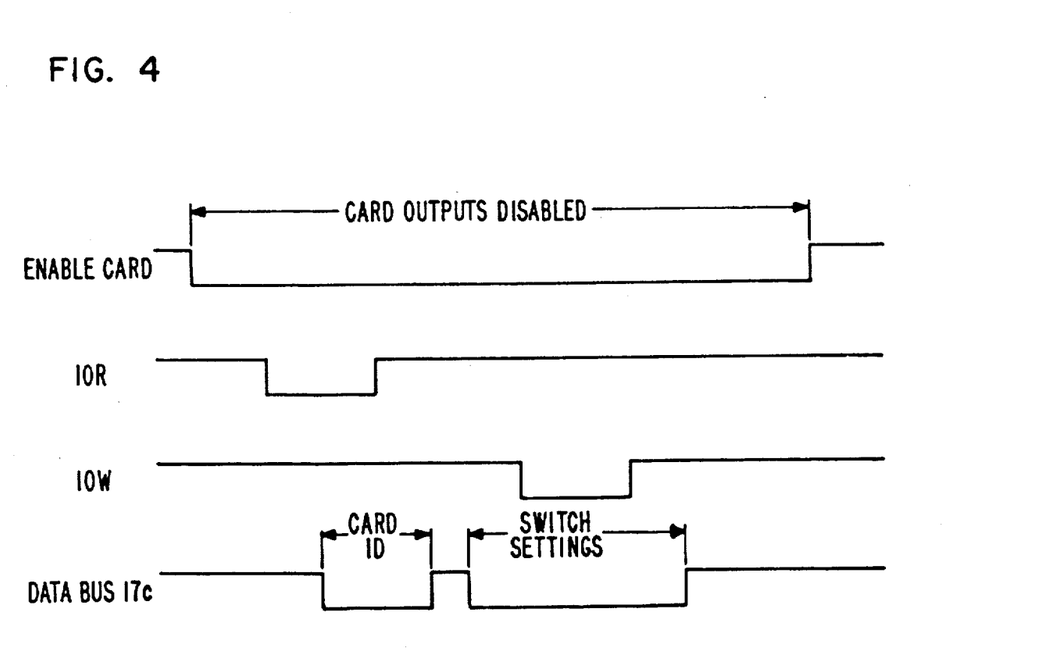
FIG. 4 shows timings for certain of the logic of FIG. 3.

During the post setup routine of FIG. 7, when an ID is being fetched from card 7, the processor 8 forces A2 negative (logical 1) and A1, A0 to logic 01 (address 101). EC7 is negative (FIG. 4). When IOR goes negative, the gate 44 produces an output at 46 to produce an output at 51 which gates the card ID value in 20 to data bus 17c. Processor 8 compares this ID with the ID in the respective slot position in memory module 10. If the IDs compare, processor 8 transfers the parameter values in the slot position 32 (FIG. 1) to data bus 17c and forces A2, A1, A0 to logic 111 (address 103). Shortly thereafter, processor 8 issues an IOW to cause gate 45 to produce an output on 49. This gates an output from 50 to register 21 via line 52 to gate the parameter values on bus 17c into register 21. The output 53 of decode 47 is used during diagnostic routines to gate the output of parameter register 21 to bus 17c via gate 54.

As discussed above with respect to a setup routine, an ID of hexadecimal value FFFF is returned during an ID fetch operation when the addressed socket is empty. One method of achieving this result is shown in FIG. 3. A pre-wired circuit 60 is gated to force bus 17 to all "1's" during the IOR cycle by a negative going signal on any one of the enable card lines EC1 to EC7 via OR circuit 61 and the negative going signal on IOR. If a card is in the socket which has been addressed, its ID is gated to bus 17c at the same time and all logical 0's in the ID override the logical 1's from 60 to correctly reproduce the ID on bus 17c.

The logic of FIG. 3 is used in a similar manner during the initialization setup and the POST setup routines of FIGS. 6 and 7.

When two identical cards (same ID) are connected to two of the I/O slots and it is desired to render both active, the first card is assigned the standard I/O default address at one priority level and the other card is assigned an alternate I/O address at a different priority level.

Figure 5:
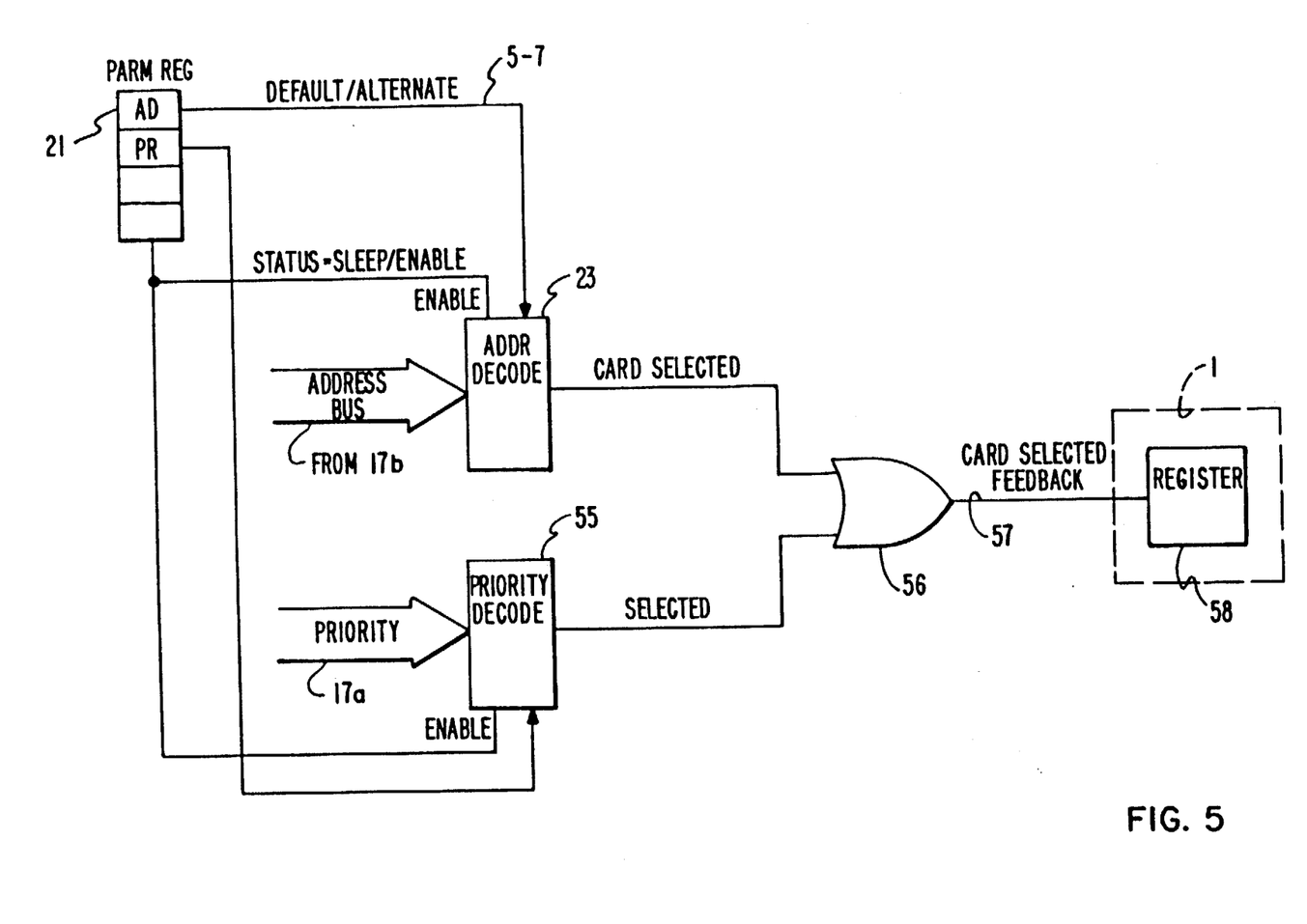
FIG. 5 shows logic utilized by test routines to check the proper selection of an I/O card.

The logic of FIG. 5 is then utilized during a diagnostic routine to ascertain whether each card properly responds to its respective I/O address. The address decode logic 23 decodes the address on bus 17b if it corresponds to the alternate address when the appropriate alternate address factor AD is stored in parameter register 21 and the least significant bit is on (the card is active). Similarly, a priority decode circuit 55 produces an output if the priority value on bus 17a is equal to PR in register 21 and the card active bit is on. If outputs are produced by logic 23 and 55, an AND gate 56 produces a feedback signal on line 57 to set one bit in a register 58 on the board 1. The CPU8 under program control will read register 58 to determine that one and only one card properly responded to the I/O alternate address and reset register 58. Similar circuits on the other identical card will respond to the default I/O address and the appropriate priority level to set another bit in register 58 for diagnostic purposes.

While there have been described what are at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a data processing system having a system processor and a plurality of I/O sockets to which peripheral control cards of various types are attachable, and in which means on at least one card permanently stores an identity value corresponding to the respective card type, said system comprising:

nonvolatile memory means storing, in memory locations thereof assigned to respective I/O sockets, the identity value and parameter data of the at least one card connected to a respective socket when power was last applied to said system, said parameter data being representative of peripheral options for the attached card; and means effective after power has been removed from and reapplied to said system for comparing the identity value on said card connected to the respective socket with the identity value stored in the corresponding nonvolatile memory location to determine if said card has been added, removed or moved since the previous removal of power from said system; and means responsive to outputs of said comparing means indicating successful comparison of the identity value for transferring and storing into said card, parameter data stored in the corresponding memory location, thereby eliminating the need to create the parameter data.

2. A data processing system having a plurality of I/O sockets for attaching cards of different types, and in which the system during subsequent power-up retrieves parameter data for at least one card currently attached to the system by way of a respective socket and in which means is provided on the card for permanently storing an identity value corresponding to the card type, said system comprising;

nonvolatile memory means storing, in memory locations thereof assigned to respective I/O sockets, the identity value and parameter data of the card connected to the respective socket before the system is powered down;

means effective upon power-up of the system for comparing the identity value stored on the attached card with the identity value stored in the nonvolatile memory location corresponding to the socket to which the card is attached; and means responsive to outputs of said comparing means indicating successful comparisons of identity values for writing and storing into each respective card the parameter data stored in its corresponding nonvolatile memory location.

3. The system of claim 2 further comprising said comparing means including means interrogating each I/O socket to fetch and identity value of the card attached to the socket and to produce a unique null identity value when an interrogated socket is empty;

said nonvolatile memory storing the null identity value in each location corresponding to an I/O socket found empty; and said comparing means further effective upon power-up of the system for comparing the null identity value produced upon interrogating an empty socket with the identity value in the nonvolatile memory location corresponding to that socket for determining if that socket had contained a card when the system previously was powered down.

4. The system of claim 2 wherein the data processing system includes a system processing unit, the system further comprising a feedback line on the card, means on the card responsive to a card select input signal and to parameter data stored on the card for effectively enabling the card to send a signal to the system processing unit by way of said feedback line indicating selection of the card.

5. The system of claim 2 further comprising said comparing means including means interrogating each I/O socket to fetch the identity value of the card attached to the socket and to produce a predetermined identity value to indicate when an interrogated socket is empty;

said nonvolatile memory storing the predetermined identity value in each location corresponding to an empty I/O socket; and said comparing means further effective upon power-up of the system for comparing the predetermined identity value produced upon interrogating an empty socket with the identity value in the nonvolatile memory location corresponding to that socket for determining if that socket had contained a card when the system previously was powered down.

6. In a computer system having attachment sockets into with peripheral control cards can be interchangeably inserted, and in which such cards have permanently stored thereon means for signalling an identity (ID) value indicating the respective card type, a method for automatically configuring such system comprising:

storing information associated with said sockets in nonvolatile randomly accessible form, such information including an ID value representing the identity of the card attached to the respective socket when the system was last powered down and address information associated with an I/O address uniquely assigned to said attached card;

at each powering up of the system, interrogating said sockets in succession and receiving back from each socket an ID signal representing either an empty condition or the identity of a card currently attached to the respective socket;

comparing said ID signal with the associated ID value of the respective socket which is stored in said nonvolatile form;

transferring the associated address information stored in nonvolatile form to a register on the card if the compared ID signal and stored ID value match, and if the compared signal and value do not match, developing new address information;

storing such new information together with the ID signal in nonvolatile form in place of the address information and ID value previously stored; and transferring said new address information to the said register on said currently attached card.

7. In a computer system having central processing facilities and a plurality of I/O sockets specifically addressable by said facilities and into which various different types of device option cards are interchangeably installable, said cards communicating with said central facilities and being subject to automatic initialization by said central facilities, to establish addressing and other parameters for determining the order of communications between said cards and the central facilities, said sockets at any time having various conditions in terms of being vacant or occupied by cards and when occupied in terms of the types of cards then installed, the improvement comprising:

means for applying power to and removing power from said system;

nonvolatile memory means in said central facilities for operating under battery power after power has been removed from said system to store information relative to each of said sockets reflecting the conditions of said sockets immediately before said system power is removed; said information including card identity information indicating the types of cards attached to occupied sockets and card addressing information relative to such attached cards, said card addressing information being unrelated to the specific addresses by which respective said sockets are specifically addressable;

register means on each of said cards for temporarily storing said card addressing information while said card is attached to a said socket and power is applied to said system;

means operative when power is applied to said system to cause said system central facilities to interrogate said sockets individually by said specific socket addresses and to receive back from each said interrogated socket information indicating if the socket is occupied by a card, and if it is, information identifying the type of card currently attached to the interrogated socket;

means for comparing said identity information received back from an occupied interrogated socket with card identity information currently stored in said nonvolatile memory means relative to the respective interrogated socket;

means responsive to said identity information received back from said interrogated socket for determining if the respective interrogated socket is vacant or occupied by a card;

means responsive to operation of said comparing means relative to any said interrogated occupied socket indicating a match between said compared identity information received back from the socket and the card identity information stored relative to said socket, and to operation of said determining means indicating that a card is in the respective interrogated socket, for causing the card addressing information stored in said nonvolatile memory means to be transferred to the register on the respective interrogated card;

means responsive to operation of said comparing means indicating a mismatch between compared identity information received back from an interrogated occupied socket and the card identity information stored relative to that socket for invoking programmed operations of said system causing said system to selectively retrieve and temporarily store new card addressing information associated with said received back identity information from a source external to said system; and means responsive to said programmed retrieval operations for causing said temporarily stored new card information to be transferred first to said nonvolatile memory means for storage in association with the respectively interrogated socket and subsequently to the register on the respective card.

8. A system in accordance with claim 7, wherein said register means on said cards and said nonvolatile memory means are to store card priority information retrievable initially in association with said invoked programmed operations of said system, and including:

means responsive to operation of said comparing means relative to all of said sockets for indicating if the condition of any socket has changed since power was last removed from the system;

means responsive to operations of said comparing means and interrogating means indicating a match between compared identities associated with any occupied one of said sockets, and to operation of said condition indicating means indicating that the conditions of all of said sockets are unchanged since power was last removed, for causing priority information contained in said nonvolatile memory means relative to said any occupied one socket to be transferred to the register on the card respectively attached to said one socket; and means responsive to operations of said comparing and interrogating means indicating a mismatch between compared identities associated with any occupied one of said sockets, and/or to operation of said condition indicating means indicating that the condition of at least one of said sockets has changed since last removal of power from said system, for developing new card priority information for said any occupied one socket based on the identities of cards in all of the occupied sockets, and for causing said new priority information to be transferred in succession to said nonvolatile memory means in association with said any occupied one socket and to the register on the card attached to that socket.

9. A system in accordance with claim 7 wherein said register means on said cards and said nonvolatile memory means store a state information programmably determinable by said system, and including:

means responsive to operation of said comparing means relative to all of said sockets for indicating if the condition of being vacant of any socket has changed since the system was last powered down;

means responsive to operations of said comparing means indicating a match between compared identities at any occupied one of said sockets and to operation of said condition indicating means indicating that the conditions of all sockets have not changed for causing the state information in the location of said nonvolatile memory means associated with said any occupied one socket to be transferred to the register means on the card attached to that socket, and;

means responsive to operations of said comparing and occupancy determining means indicating a mismatch between compared identities associated with any occupied one of said sockets, and/or to operation of said condition indicating means indicating that the condition of at least one of said sockets has changed, for developing new state information for said any occupied one socket based on the identity of the card attached to that socket and identities of cards in the other sockets and for causing said new state information to be transferred in succession to said nonvolatile memory means in associated with said any occupied one socket and the register on the card attached to that socket.

10. In a data processing system comprising one or more processing units, one or more memory units, I/O sockets for attachment of peripheral option cards, and an I/O bus interconnecting said units with each other and with said sockets for transferring information between said units and between cards attached to said sockets and said units, each said socket at any time having a condition of being either vacant or occupied by any of a plurality of different types of option cards, each of said memory units and sockets having a predetermined address on said bus, the improvement comprising:

means for selectively applying power to and removing power from said system;

means on each of said cards for permanently storing card identity signals indicating the respective card type;

register means on each of said cards for temporarily storing information controlling access of the respective card to said bus when the card is attached to a said socket and power is applied to said system;

nonvolatile memory means coupled to said bus and having address locations associated with said socket addresses for storing key control information relative to said sockets while power is removed from said system; said key control information including card identity information relative to sockets having occupied conditions prior to removal of said power and bus access control information relative to cards attached to said occupied sockets;

means in at least one of said processing units and said bus, operating when power is applied to said system for addressing said sockets in succession and causing condition interrogating signals to be applied in succession to said sockets;

means coupled to vacant ones of said sockets and said bus responsive to application of said interrogating signals to respective sockets for returning predetermined null signals to said at least one of said processing units indicating vacant conditions at respective sockets;

means coupled to occupied ones of said sockets and said bus responsive to application of said interrogating signals to respective sockets for returning card identity signals from cards attached to respective sockets;

means in said at least one processing means for comparing the card identity signals returned from said cards with card identity information stored relative to the respective sockets in said nonvolatile memory means; and means responsive at least in part to operations of said comparing means indicating matches between compared card identity signals and card identity information stored in said nonvolatile memory means for causing said system to transfer bus access control information from the location in said nonvolatile memory means associated with the respective interrogated socket to the register on the card attached to that socket.

11. A data processing system in accordance with claim 10 wherein said system can assign an I/O address to any card attached to said sockets which is related functionally to the card type and not related to the address of the socket to which the card is attached, wherein said bus access control information includes card address factor information logically related to said I/O address, and wherein said cards have control means responsive to card address information in the register of the respective card and presence of a logically related I/O address signal on the bus to enable the respective card to receive other information from said units via said bus.

12. A data processing system in accordance with claim 11 including:
means responsive to said comparing means indicating mismatch between the card identity signal returned by any occupied one of said sockets and the card identity information stored relative to that socket in said nonvolatile memory means for invoking programmed operations of said system for establishing a new address factor and a new I/O address for the card currently attached to the respective socket, said system transferring said new address factor to the nonvolatile memory means and the register on said card currently attached, said system thereafter using said new I/O address to initiate communications via said bus with said card currently attached.

13. A data processing system in accordance with claim 12 wherein said key bus access control information further includes priority level information which when transferred to said register on a card establishes a priority level relative to other attached cards for arbitrating for access to said bus.

14. A data processing system according to claim 13 wherein the system includes:
means responsive to mismatching indications of said comparing means for determining when two cards of the same type are attached to two of said sockets; and
means responsive to said determining that two cards of the same type are attached for assigning a predetermined default address factor and a first priority level to one of said cards and an alternate address factor and a second priority level to the other of said cards.

15. A data processing system having a plurality of I/O sockets for attaching cards of different types, and in which the system during an initial power-up creates parameter data for at least one card currently attached to the system by way of a respective socket and in which means is provided on the card for permanently storing an identity value corresponding to the card type, said system comprising:
nonvolatile memory means storing, in memory locations thereof assigned to respective I/O sockets, the identity value and parameter data of the card connected to the respective socket before the system is powered down;
means effective upon power-up of the system for comparing the identity value stored on the attached card with the identity value stored in the nonvolatile memory location corresponding to the socket to which the card is attached; and
means responsive to outputs of said comparing means indicating successful comparisons of identity values for writing and storing into each respective card the parameter data stored in its corresponding nonvolatile memory location.

16. In a computer system having at least one attachment socket into which peripheral control cards can be interchangeably inserted, and in which at least one card has permanently stored thereon means for signalling an identity (ID) value indicating the respective card type, apparatus for automatically configuring such system comprising:
means for storing information associated with said socket in nonvolatile form, such information including an ID value representing the identity of the card attached to the respective socket when the system was last powered down and address information associated with an I/O address uniquely assigned to said attached card;
at each powering up of the system, means for interrogating said socket and receiving back from said socket an ID signal representing either an empty condition or the identity of a card currently attached to the respective socket;
means for comparing said ID signal with the associated ID value of the respective socket which is stored in said nonvolatile form;
means for transferring the associated address information stored in nonvolatile form to a storage means on the card if the compared ID signal and stored ID value match, and if the compared signal and value do not match, means for developing new address information;
means for storing such new information together with the ID signal in nonvolatile form in place of the address information and ID value previously stored; and
means for transferring said new address information to the said storage means on said currently attached card.

17. In a computer system having at least one attachment socket into which peripheral control cards can be interchangeably inserted, and in which at least one card has permanently stored thereon means for signalling an identity (ID) value indicating the respective card type, apparatus for automatically configuring such system comprising:
means for storing information associated with said socket in nonvolatile form, such information including an ID value representing the identity of the card attached to the respective socket when the system was last powered down and priority information representing the priority of said attached card;
at each powering up of the system, means for interrogating said socket and receiving back from said socket an ID signal representing either an empty condition or the identity of a card currently attached to the respective socket;

means for comparing said ID signal with the associated ID value of the respective socket which is stored in said nonvolatile form;

means for transferring the associated priority information stored in nonvolatile form to a storage means on the card if the compared ID signal and stored ID value match, and if the compared signal and value do not match, means for developing new priority information;

means for storing such new information together with the ID signal in nonvolatile form in place of the priority information and ID value previously stored; and means for transferring said new priority information to the said storage means on said currently attached card.

18. In a computer system having at least one attachment socket into which peripheral control cards can be interchangeably inserted, and in which at least one card has permanently stored thereon means for signalling an identity (ID) value indicating the respective card type, apparatus for automatically configuring such system comprising:

means for storing information associated with said socket in nonvolatile form, such information including an ID value representing the identity of the card attached to the respective socket when the system was last powered down and parameter data representing peripheral control options of said attached card;

at each powering up of the system, means for interrogating said socket and receiving back from said socket an ID signal representing either an empty condition or the identity of a card currently attached to the respective socket;

means for comparing said ID signal with the associated ID value of the respective socket which is stored in said nonvolatile form;

means for transferring the associated parameter data stored in nonvolatile form to a storage means on the card if the compared ID signal and stored ID value match, and if the compared signal and value do not match, means for developing new parameter data;

means for storing such new parameter data together with the ID signal in nonvolatile form in place of the parameter data and ID value previously stored; and means for transferring said new parameter data to the said storage means on said currently attached card.

* * * * *